D. C. BAKER & H. F. HANSEN.
ROTARY PUMP.
APPLICATION FILED JAN. 21, 1914.
1,123,977.
Patented Jan. 5, 1915.
2 SHEETS—SHEET 2.
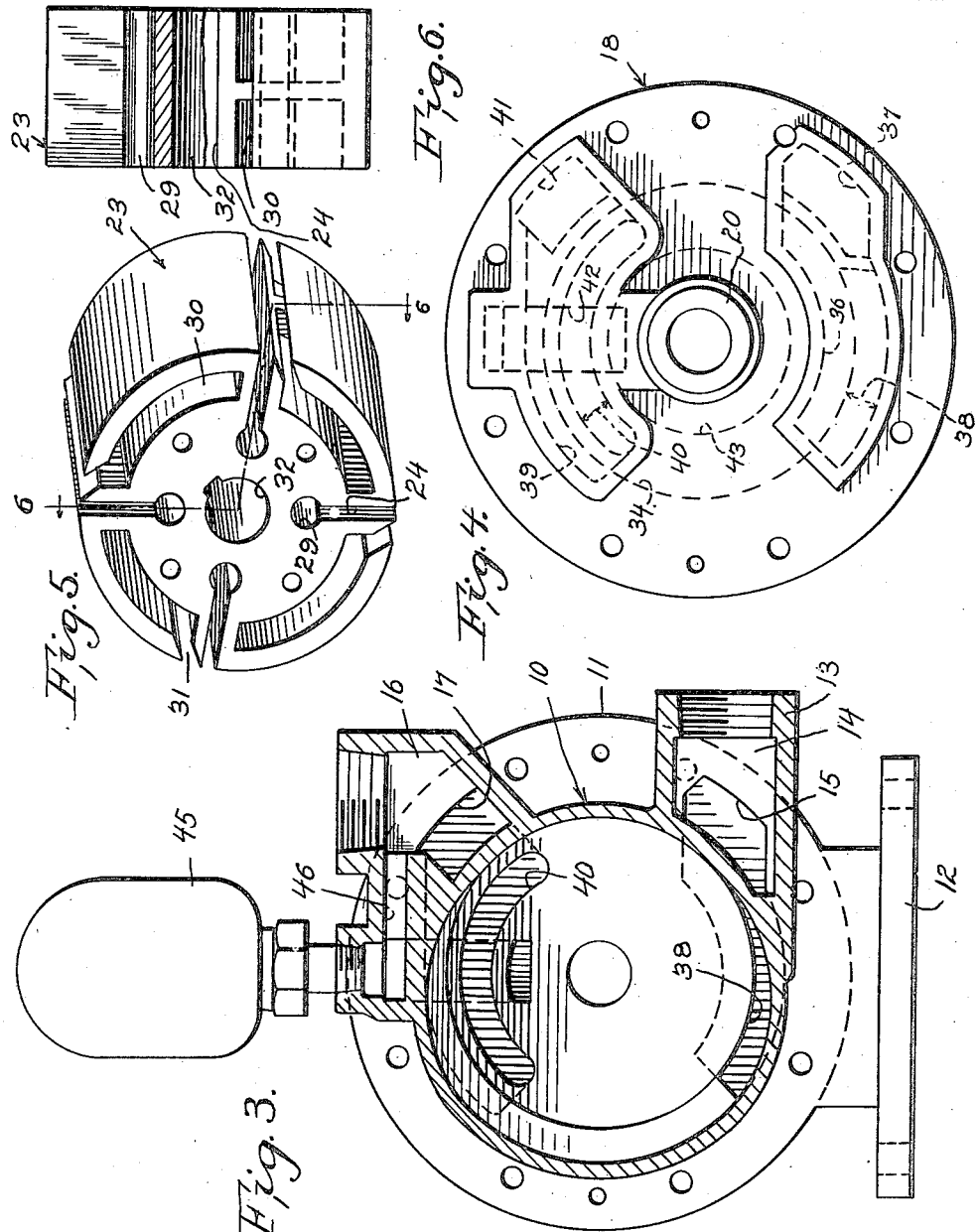
Witnesses
R. M. Jones
R. M. Smith
Inventors
D. C. Baker. H. F. Hansen.
By
Attorney

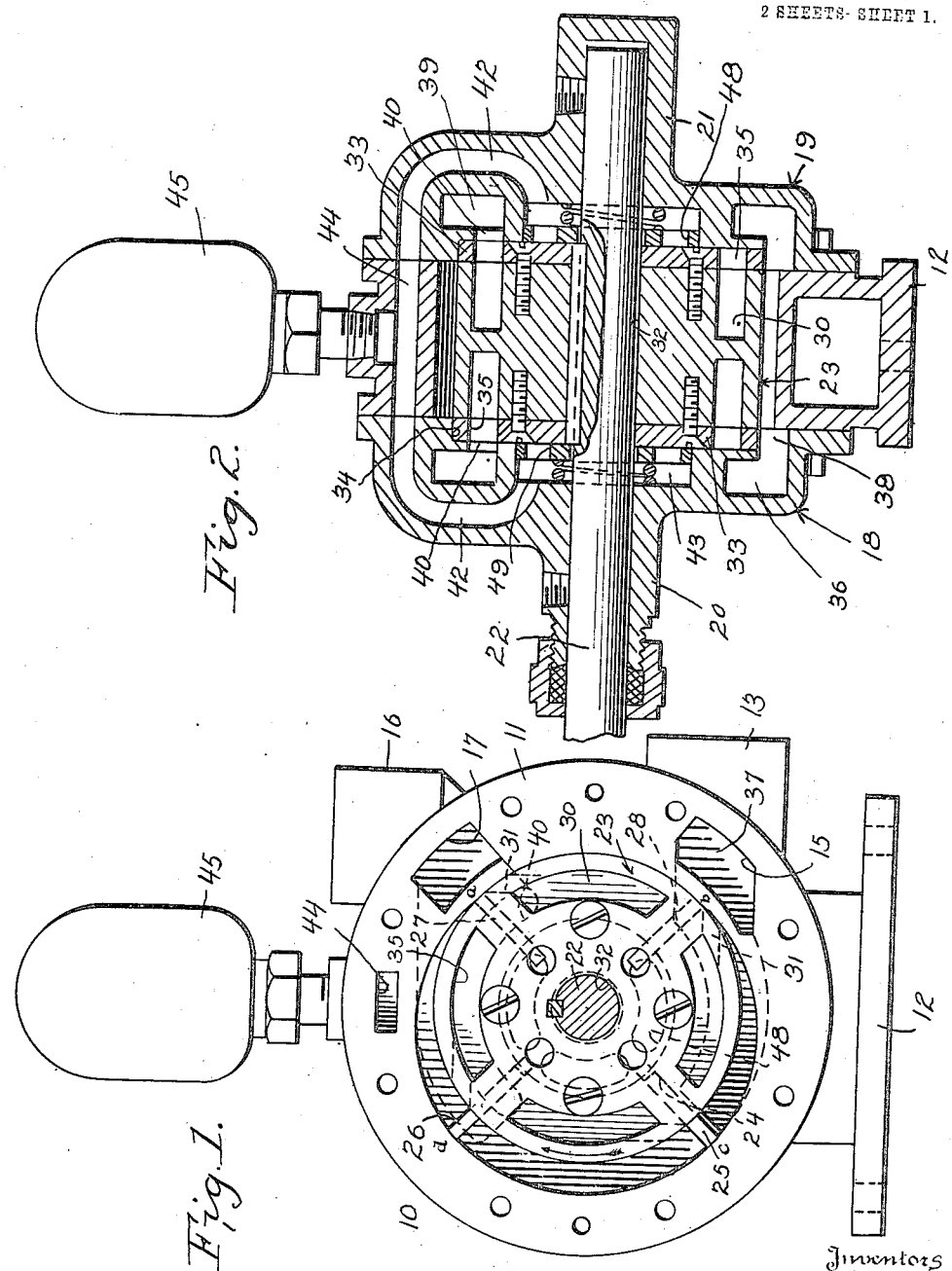

UNITED STATES PATENT OFFICE.

DEXTER C. BAKER AND HARVEY F. HANSEN, OF OAKLAND, CALIFORNIA, ASSIGNORS TO BAKER-HANSEN MANUFACTURING COMPANY, OF EAST OAKLAND, CALIFORNIA, A CORPORATION OF CALIFORNIA.

ROTARY PUMP.

1,123,977.  Specification of Letters Patent.  Patented Jan. 5, 1915.

Application filed January 21, 1914. Serial No. 813,493.

*To all whom it may concern:*

Be it known that we, DEXTER C. BAKER and HARVEY F. HANSEN, citizens of the United States, residing at Oakland, in the county of Alameda and State of California, have invented certain new and useful Improvements in Rotary Pumps; and we do hereby declare the following to be a full, clear, and exact description of the invention, such as will enable others skilled in the art to which it appertains to make and use the same.

The primary object of this invention is to provide a rotary pump of extremely simple and practical construction, having a novelly formed rotor or runner which facilitates the discharge of liquid or air from the pump casing.

Another and more specific object of the invention is to provide in a rotary pump, a runner or rotor formed with a plurality of radial slots opening on the periphery thereof to receive sliding pistons or blades and also provided with arcuate passages opening upon the sides thereof and upon the periphery in advance of the respective blade with which they coöperate, said passages communicating with discharge chambers formed in the cylinder heads.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which—

Figure 1 is a side elevation of our improved rotary pump with one of the heads removed, Fig. 2 is a vertical sectional view on a plane passing centrally through the pump, Fig. 3 is a central vertical section through the pump, taken on a plane at right angles to the axis of the pump shaft, the rotor being omitted, Fig. 4 is an outside elevation of one of the cylinder heads, Fig. 5 is a perspective view of the rotor, and Fig. 6 is a view taken on the plane of line 6—6 of Fig. 5.

Referring in detail to the drawings by numerals, 10 designates, as an entirety, the cylinder or body of the pump, having flanges 11 and a base 12. The cylinder is provided with an intake chamber 14 formed adjacent its inner end and on opposite sides thereof with a pair of discharge ports or openings 15 extending through the flanges 11.

16 indicates the discharge chamber of the pump, said chamber being formed with openings or ports 17 extending through the flange 11.

A pair of cylinder heads, designated as an entirety, by the numerals 18 and 19 are bolted or otherwise secured to the flanges 11 so as to close the central chamber of the cylinder, and are formed with bearings 20 and 21 which support a shaft 22 eccentrically within the cylinder. A runner or rotor 23 is keyed to the shaft 22 within the pump cylinder and is formed with a plurality of radial slots 24 to accommodate sliding blades or pistons 25, 26, 27 and 28, and the inner ends of these slots are enlarged, as indicated by the numeral 29, for a purpose to be hereinafter explained. The rotor is also formed with a plurality of arcuate passages 30 arranged in pairs which open upon opposite sides of the rotor and which open upon the periphery thereof, as indicated by the numeral 31.

Referring to Fig. 5, it will be seen that the walls of the opening 31 are parallel to each other but are inclined to the periphery of the rotor, forming acute angles with the plane of the adjacent blades. The centers of the arcuate passages 30 coincide with the center of the opening 32 through which the shaft 22 extends. Circular plates 33 are secured to the sides of the rotor, fit within annular recesses 34 formed in the heads 18 and 19 and are provided with openings 35 which register with the passages 30. These plates are for the purpose of assisting in the support of the rotor, and are found to be very advantageous in large pumps and in pumps where a heavy pressure is obtained. In smaller pumps these plates are not essential and may be dispensed with, if desired, in which case the heads are formed without the recesses 34.

To conduct the fluid from the intake chamber 14 to the interior of the pump, I form the heads 18 and 19 with arcuate passages 36, each of which is formed with two openings 37 and 38 respectively, which register with the ports 15 and the space between the periphery of the rotor and the cylinder wall respectively. The heads are also formed with exits or discharge passages 39, each of which is formed with an arcuate opening 40, which open within the cylinder and a second opening 41 which registers with the port 17 in the discharge chamber 16. The slots 40 are concentric with the shaft 22 and have the same radii as the passages 30, so that said passages register with the slot as the rotor is revolved. The cylinder heads are also formed with passages 42 which open at their inner ends into annular valve chambers 43 and at their outer ends upon a passage 44 formed in the cylinder 10, said passage communicating with an air chamber 45 and the discharge chamber 16, the latter connection being made by means of a passage 46, clearly shown in Fig. 3. A stationary disk valve 47 is arranged within each of the valve chambers 43 and is formed with a plurality of arcuate ports 48 which establish communication between the inner enlarged ends 29 of the radial slots 24 and the valve chambers. The arrangement of the air chamber 45, passages 44 and 42, and the disk valve 47 provides for a pressure against the inner end of the blades equal to the pressure in the discharge chamber 16, so that the blades will be held properly in their extended or projected position. It will be noted, upon reference to Fig. 1, that there is no outward pressure upon the blades when they are not projected or when they are traveling from the openings 17 to the intake openings 15, this being true, since the valve disks are unslotted through that portion of their area corresponding with the distance between said ports.

Before proceeding to a description of the operation of our improved pump, we desire to direct attention to the fact that those portions of the peripheral wall of the cylinder chamber, forming the arcs a—b and c—d are concentric with the rotor, whereas those portions forming the arcs d—a and b—c are eccentric, and further, that as soon as a blade passes the opening 38, the forward terminals of the passages 30, directly in advance of said blade, move into registration with the forward end of the ports 40, and that the passages 30 remain in communication with the ports or openings 40 until the blade strikes the concentric portion of the cylinder chamber formed by the arc a—b.

In operation, the shaft 22 is turned by any suitable means, causing the rotor to revolve and suck fluid into the rotor chamber through the intake chamber 14, openings 15, passages 36 and openings 38. The fluid entering the rotor chamber through the openings 38, is caught by the revolving blades and discharged through the discharge port or chamber 16. Referring to Fig. 1, it will be seen that as the rotor continues to revolve, the fluid in advance of the blade 25, will flow through the openings 31 immediately in advance of said blade into the passages 30 and as these passages are in communication with the exit chambers 39, the fluid will pass into the said last mentioned chambers and out of the head through the opening 41 which are in registration with the openings 17 in the discharge chamber 16. The blade 25 continues to act on the fluid until it has traveled through an arc of substantially one hundred and eighty degrees, or until it reaches the beginning of the concentric portion embraced by the arc a—b. It will be noted that in the particular embodiment of our invention shown in the drawings, two blades are always acting to discharge the fluid, but it will be understood that the total number of blades may be increased and hence the number of blades which act at any one time upon the fluid.

By our peculiar construction of rotor and cylinder heads, we prevent the fluid backing up in advance of the discharge ports, which has been a serious defect in rotors of this type heretofore. Our construction allows a free and easy egress of the fluid, therefore rendering the pump highly efficient.

While we have shown and described the preferred embodiment of our invention, it will be apparent that minor changes in construction and arrangements of parts, such for instance as having the passages 30 of the rotor open upon one side thereof only and having only one discharge passage 39, can be made without departing from the scope and spirit of the invention as claimed.

Having thus described our invention, we claim:—

1. In a rotary pump, a cylinder having an intake port and a discharge port, a rotor eccentrically mounted within said cylinder, radially movable blades carried by the rotor, cylinder heads formed with passages establishing communication between the rotor chamber and intake and discharge ports, said rotor being formed with passages for communication with the passages formed in the head.

2. In a rotary pump, a cylinder having a rotor chamber, an intake compartment and a discharge compartment, a rotor eccentrically mounted within said cylinder, radially movable blades carried by the rotor, a pair of cylinder heads formed with passages which establish communication between the intake chamber and the rotor chamber and between the rotor chamber and the discharge chamber, the rotor being formed with passages opening upon the periphery and the sides thereof, to register with the discharge passage formed in the cylinder head.

3. In a rotary pump, a cylinder forming a rotor chamber and having an intake chamber and a discharge chamber, a rotor eccentrically mounted within the rotor chamber, radially movable blades carried by the rotor, and cylinder heads, one of said heads being formed with an intake passage and with a discharge passage, the intake passage establishing communication between the intake chamber and the rotor chamber and the discharge passage establishing communication between the rotor chamber and the discharge chamber, the rotor being formed between the blades thereof with passages adapted to register with said discharge passages.

4. In a rotary pump, a cylinder having a rotor chamber and formed with an intake chamber and a discharge chamber, a rotor eccentrically mounted within the rotor chamber, a plurality of radially movable blades carried by the rotor, and a pair of cylinder heads closing the sides of the cylinder, each head being formed with an intake passage and a discharge passage, said passages communicating with the intake and discharge chambers respectively and with the rotor chamber, the rotor being provided between the blades thereof with passages opening upon its periphery and upon its sides, said last mentioned passages being adapted to register with the discharge passages formed in the heads.

In testimony whereof we affix our signatures in presence of two witnesses.

DEXTER C. BAKER.
HARVEY F. HANSEN.

Witnesses:
H. A. THOMAS,
JAY ERWIN BAKER.